(12) United States Patent
Nishimoto et al.

(10) Patent No.: US 6,841,401 B1
(45) Date of Patent: Jan. 11, 2005

(54) INTEGRATED CIRCUIT DEVICE AND CORRECTION METHOD FOR INTEGRATED CIRCUIT DEVICE

(75) Inventors: Ikuo Nishimoto, Tokyo (JP); Shiro Kano, Tokyo (JP); Shigeo Miyagawa, Tokyo (JP)

(73) Assignee: Yamatake Corporation, Tokyo (JP)

( * ) Notice: Subject to any disclaimer, the term of this patent is extended or adjusted under 35 U.S.C. 154(b) by 212 days.

(21) Appl. No.: 10/129,895

(22) PCT Filed: Nov. 10, 2000

(86) PCT No.: PCT/JP00/07961

§ 371 (c)(1),
(2), (4) Date: Aug. 21, 2002

(87) PCT Pub. No.: WO01/36917

PCT Pub. Date: May 25, 2001

(30) Foreign Application Priority Data

Nov. 12, 1999 (JP) .......................... 11-322849

(51) Int. Cl.[7] .............................................. H01L 21/00
(52) U.S. Cl. ......................................... 438/10; 73/1.01
(58) Field of Search .............................. 438/10, 14, 17, 438/18; 340/505, 10.41, 10.2, 10.1; 257/679, 678, 48; 73/1.01; 324/763, 765; 702/49

(56) References Cited

U.S. PATENT DOCUMENTS 5,394,105 A  2/1995  Axer
5,440,302 A  8/1995  Irmer et al.
5,519,644 A  * 5/1996  Benton .......................... 702/88
6,529,127 B2 * 3/2003  Townsend et al. ........... 340/505

FOREIGN PATENT DOCUMENTS

JP   59-225323 A   12/1984
JP      62-826 A    1/1987
WO  WO 94/25105 A1  11/1994

* cited by examiner

*Primary Examiner*—Robert Pascal
*Assistant Examiner*—Monica D. Harrison
(74) *Attorney, Agent, or Firm*—Frishauf, Holtz, Goodman & Chick, P.C.

(57) ABSTRACT

An integrated circuit device has a device main body 1 having a predetermined circuit function of providing an output corresponding to an input thereto, and is provided with a power supply section 4 for receiving through a coil 3 electromagnetic wave energy applied from outside to generate predetermined internal electric power required to operate the integrated circuit device. The integrated circuit device further includes a calibration data acquisition circuit (operation control section 5) for detecting the output of the device main body 1 operated in a predetermined operating environment to obtain calibration data on the device main body, and a nonvolatile memory 6 for storing the calibration data. Using the calibration data stored in the nonvolatile memory, the output of the device main body 1 during actual use of the integrated circuit device is corrected (calibrated), whereby deviation or dispersion of the output or output characteristic of the device main body attributable to an individual difference thereof is efficiently corrected with ease.

18 Claims, 4 Drawing Sheets

INTEGRATED CIRCUIT DEVICE AND CORRECTION METHOD FOR INTEGRATED CIRCUIT DEVICE

This application is a U.S. National Phase Application under 35 USC 371 of International Application PCT/JP00/07961 filed Nov. 10, 2000.

TECHNICAL FIELD

The present invention relates to an integrated circuit device having a device main body which provides an output corresponding to an input thereto, such as a sensing circuit or an amplifier. More particularly, the present invention relates to an integrated circuit device having a calibrating function whereby deviation or dispersion of the output or output characteristic of a device main body attributable to an individual difference thereof can be corrected with ease, and to a calibration method for such an integrated circuit device.

BACKGROUND ART

A sensing circuit provided with a temperature-sensitive element is originally designed to provide an output corresponding to the temperature (input) of a sensing part thereof, but the output is not necessarily indicative of accurate temperature. Owing to dispersion (individual difference) of the characteristic of the temperature-sensitive element, for example, the output of the sensing circuit is prone to deviation or dispersion. Also in the case of a signal transfer circuit such as an amplifier, its signal transfer characteristic (amplification characteristic) varies due to an individual difference of the circuit, causing deviation or dispersion of the output.

Conventionally, therefore, an output adjusting element comprising a thin film resistor or the like, for example, is formed in the main body of the circuit device, and is trimmed using a laser or the like in the final inspection step to adjust the output from the device main body (sensing circuit or signal transfer circuit), thereby correcting deviation or dispersion of the output and obtaining the intended output characteristic.

However, considerable labor and time are required in the final inspection step to trim such an output adjusting element arranged in an integrated circuit device having a sensing circuit or signal transfer circuit incorporated therein as the device main body. In addition, in order to form the output adjusting element comprising a thin film resistor or the like, a thin film formation step needs to be added to the manufacturing process or a special manufacturing process must be employed.

DISCLOSURE OF THE INVENTION

The present invention was created to eliminate the aforementioned disadvantages, and an object thereof is to provide an integrated circuit device having a calibrating function whereby deviation or dispersion of the output or output characteristic of the device main body attributable to an individual difference thereof can be efficiently corrected with ease.

Another object of the present invention is to provide a calibration method which makes good use of the calibrating function and is capable of collectively calibrating a large number of integrated circuit devices.

To achieve the first object, the present invention provides an integrated circuit device comprising a device main body having a predetermined circuit function of providing an output corresponding to an input thereto.

The integrated circuit device further comprises, besides the device main body, a power supply section including a coil, for receiving through the coil electromagnetic wave energy applied from outside to generate predetermined internal electric power required to operate the integrated circuit device, a calibration data acquisition circuit for detecting an output of the device main body operated in a predetermined operating environment to obtain calibration data on the device main body, and a nonvolatile memory for storing the calibration data.

Thus, in the integrated circuit device of the present invention, the power supply section receives through the coil the electromagnetic wave energy applied from outside and generates internal electric power to operate the integrated circuit device, and the calibration data acquisition circuit obtains, as the calibration data, the output of the device main body operated in the predetermined operating environment and stores the obtained calibration data in the nonvolatile memory, so that the nonvolatile memory holds information about deviation of the output or output characteristic of the integrated circuit device, and thus the device main body, attributable to an individual difference thereof.

Once the calibration data obtained in the predetermined operating environment is stored in the nonvolatile memory, the output from the device main body during subsequent operation of the integrated circuit device can be easily corrected using the calibration data stored in the nonvolatile memory, or be handled taking the deviation into account. As a consequence, the deviation or dispersion of the output or output characteristic of the device main body attributable to an individual difference thereof can be corrected with ease.

The present invention also provides an integrated circuit device wherein the nonvolatile memory stores, in addition to the calibration data, information about the predetermined operating environment in which the output (calibration data) of the device main body was detected. With this arrangement, even in cases where individual integrated circuit devices are operated in different operating environments at the time of calibration, the calibration can be performed with accuracy. Further, where multiple items of calibration data are obtained with the operating environment changed, higher-accuracy calibration can be performed.

In a preferred embodiment of the present invention, calibration processing means is provided for correcting the output of the device main body in accordance with the calibration data stored in the nonvolatile memory. Further provided is data output means for outputting, together with the output of the device main body, the calibration data stored in the nonvolatile memory to outside. In this case, the integrated circuit device is preferably constructed such that the output of the device main body is also stored in the nonvolatile memory, and that upon receipt of a data output request from an external device, both the output and the calibration data are read out and output.

In a still preferred embodiment of the present invention, the device main body comprises a sensing circuit having a temperature-sensitive or pressure-sensitive element. The device main body may alternatively comprise a signal transfer circuit for providing an output signal corresponding to an input signal applied thereto. In this case, the calibration data acquisition circuit has the function of generating a pseudo input signal for the signal transfer circuit, and using the pseudo input signal, the output signal of the signal transfer circuit is detected.

In a calibration method according to the present invention, a plurality of integrated circuit devices constructed as described above are placed in a thermostatic chamber to be kept in a predetermined temperature environment, and while in this state, electromagnetic wave energy is applied collectively to the integrated circuit devices to operate same, the calibration data obtained being stored in the respective nonvolatile memories.

Namely, instead of electrically connecting the integrated circuit devices individually to a predetermined calibration processing device for calibration, the integrated circuit devices are placed in the thermostatic chamber to be kept in a constant temperature environment. While in this state, electromagnetic wave energy is applied collectively in a non-contact manner to the integrated circuit devices to operate same, thereby collectively calibrating the integrated circuit devices.

BEST MODE OF CARRYING OUT THE INVENTION

An integrated circuit device according to one embodiment of the present invention will be hereinafter described with reference to the drawings.

Figure 1:
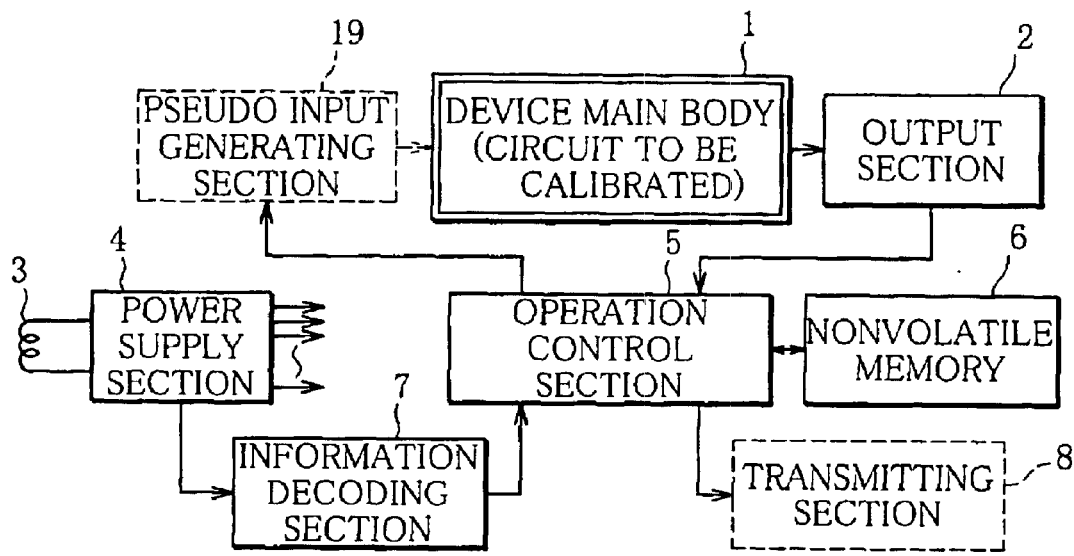
FIG. 1 is a diagram schematically showing the construction of an integrated circuit device according to one embodiment of the present invention.

FIG. 1 schematically shows the construction of the integrated circuit device according to the embodiment, wherein reference numeral 1 denotes a device main body having a predetermined circuit function. The device main body 1 comprises, for example, a sensing circuit provided with a temperature-sensitive element, such as a ring oscillator, and is designed to provide an output corresponding to the temperature of a sensing part thereof, more specifically, a pulse signal whose period (frequency) is dependent on the temperature of the sensing part, as described later. An output section 2, which receives the output from the device main body 1, has the function of displaying a temperature value represented by the output or transmitting the temperature information to a host computer or the like, not shown.

The integrated circuit device, which is thus provided as a principal part thereof with the device main body 1 comprising a sensing circuit, is characterized by further comprising, besides the device main body 1, a power supply section 4 for receiving, through a coil 3, electromagnetic wave energy applied from outside to generate internal electric power required to operate the integrated circuit device, an operation control section 5 having the function of a calibration data acquisition circuit for detecting, as calibration data on the device main body 1, an output of the device main body 1 operated in a predetermined operating environment, and a nonvolatile memory 6 for storing the calibration data obtained by the calibration data acquisition circuit (operation control section 5).

Figure 2:
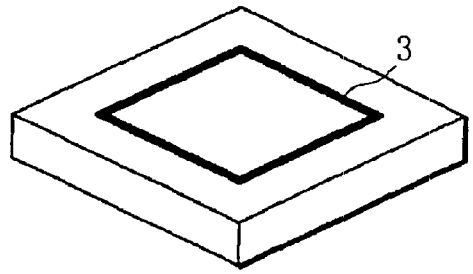
FIG. 2 is a view showing a concrete example of the integrated circuit device of FIG. 1, along with a coil arranged on the integrated circuit device.
Figure 3:
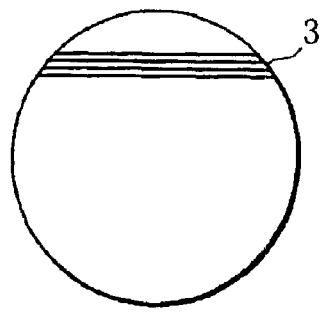
FIG. 3 is a view showing another concrete example of the integrated circuit device of FIG. 1, along with a coil arranged on the integrated circuit device.

In the case where the integrated circuit device is embodied as a chip device diced from a semiconductor wafer, for example, the coil 3 may be a ring-shaped conductor with several turns which is formed by photolithography etc. on a surface of a semiconductor chip constituting the substrate of the integrated circuit device and which extends along peripheral edges thereof, as shown in FIG. 2. Where the integrated circuit device is embodied as a spherical semiconductor with a diameter of about 1 mm, the coil may be a conductor with several turns formed on the spherical surface of the semiconductor, as shown in FIG. 3.

Figure 4:
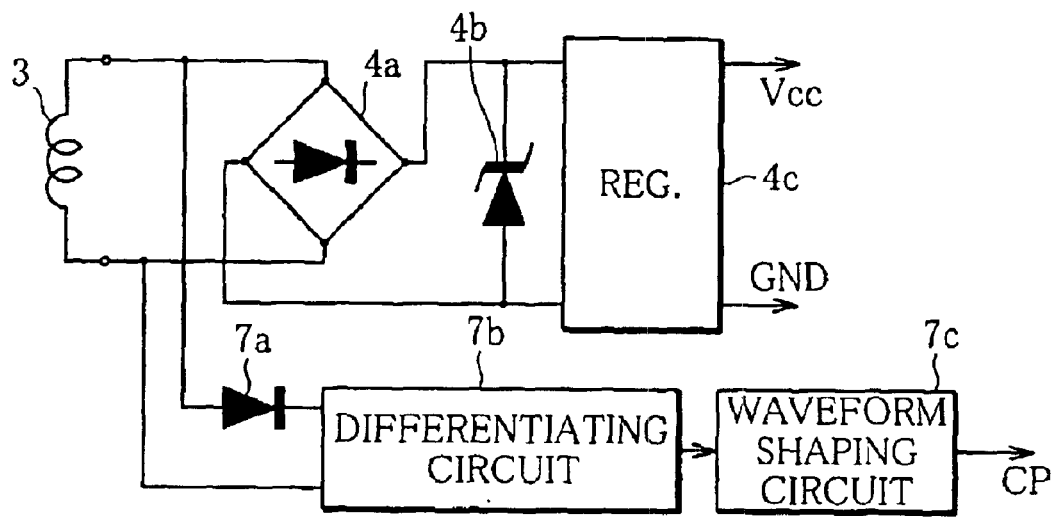
FIG. 4 is a diagram showing an exemplary arrangement of a power supply section in the integrated circuit device of FIG. 1, along with an example of a circuit for generating a reference clock signal CP.

The power supply section 4 comprises, as shown in FIG. 4, for example, a rectifier 4a for rectifying the electromagnetic wave energy (electric power) received through the coil 3, a limiter 4b, such as a Zener diode, for limiting a maximum voltage of the rectified output (direct current) of the rectifier 4a, and a regulator 4c for receiving the output (direct current) of the rectifier 4a, of which the maximum voltage has been limited by the limiter 4b, to produce a predetermined interval voltage Vcc. Since the power supply section 4 is provided, the integrated circuit device can be applied with and operated by electromagnetic wave energy while in an isolated state, without being mechanically connected to a calibrating apparatus or power supply unit, not shown, and calibration data on the output of the device main body 1 can be obtained by the operation control section 5.

The coil 3 also functions as an antenna via which operation control information is supplied to the integrated circuit device or the calibration data etc. obtained by the integrated circuit device is transmitted.

The operation control section 5 operates on receiving a reference clock signal CP with a predetermined frequency output from an information decoding section 7, for example. The operation control section then detects the output (period of a pulse signal) from the device main body 1 and writes the detection data into the nonvolatile memory 6 as the calibration data on the device main body 1, as described later. At this time, the operation control section 5 may write, in the nonvolatile memory 6, not only the output (calibration data) of the device main body 1 but information about the operating environment (temperature etc. at the time of calibration) in which the output of the device main body 1 was detected.

The information decoding section 7 is connected to the power supply section 4 and has the function of generating the reference clock signal CP in accordance with the frequency of the electromagnetic waves received through the coil 3. Specifically, as shown in FIG. 4, the information decoding section 7 comprises a rectifier circuit 7a, which is a diode for subjecting the alternating current obtained through the coil 3 to half-wave rectification, a differentiating circuit 7b for differentiating the rectified output, and a waveform shaping circuit 7c for shaping the waveform of the differential output and generating the reference clock signal CP. Accordingly, where the electromagnetic waves applied to the coil 3 have a frequency of 10 MHz, the information decoding section 7 generates the reference clock signal CP with a clock frequency of 10 MHz, that is, a pulse interval of 0.1 μsec.

The information decoding section 7 may have an additional function of decoding various information codes which are transmitted from the host computer or the like, not shown, while being superimposed on the electromagnetic waves, so that various operation commands may be supplied to the operation control section 5 from the information decoding section 7. In this case, the coil 3 is designed to function as an information communication antenna and the electromagnetic waves are modulated in accordance with the information codes, for example, so that the information codes may be transmitted as modulated electromagnetic waves to the integrated circuit device, together with the electromagnetic wave energy. By thus using the electromagnetic waves to give an operation command to the operation control section 5, it is possible to obtain calibration data in a plurality of different operating environments while changing the operating environment of the device main body 1, for example. Further, the operation control section 5 may be designed to perform the function of correcting the output of the device main body 1 in accordance with the calibration data stored in the nonvolatile memory 6.

Figure 5:
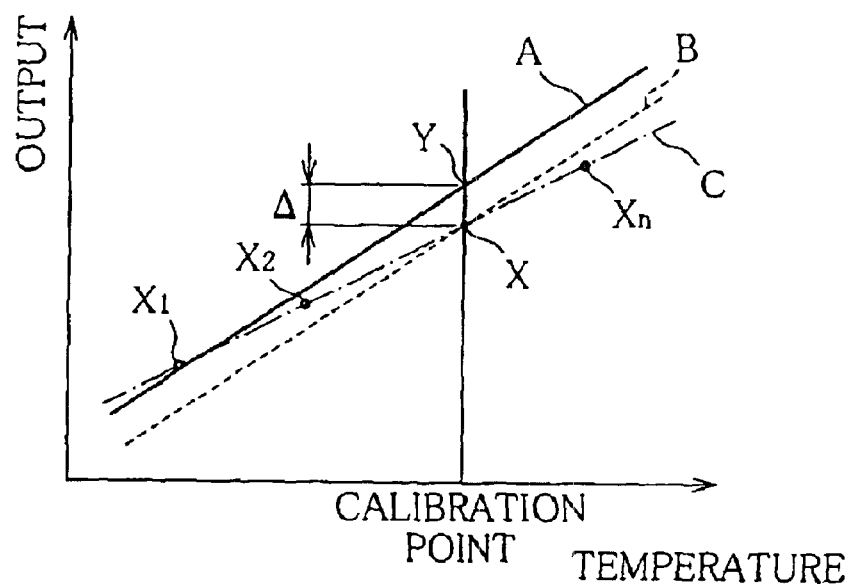
FIG. 5 is a graph illustrating a difference between an output characteristic A of a device main body according to design specification and an actual output characteristic B, as well as calibration.

The output of the sensing circuit constituting the device main body 1 will be now described. The sensing circuit provided with a temperature-sensitive element is designed and manufactured such that the output thereof has a characteristic (solid line A) that linearly varies with temperature, as shown in FIG. 5, for example. However, the integrated circuit device having the sensing circuit (device main body 1) incorporated therein inevitably has an individual difference attributable to manufacturing error etc. Thus, the sensing circuit actually obtained may have an output characteristic indicated by the dashed line B in FIG. 5, for example. Namely, the output or output characteristic of the sensing circuit is subject to deviation or dispersion.

Accordingly, with the integrated circuit device kept in a predetermined operating environment, for example, a preset temperature environment, the operation control circuit 5 (calibration data acquisition circuit) obtains an output X of the sensing circuit (device main body 1) and stores the obtained output in the nonvolatile memory 6 as the calibration data. A difference Δ between the output X and an intended design basis value Y represents an output deviation of the sensing circuit (device main body 1), that is, a deviation from the intended output characteristic A; therefore, the operation control section 5 corrects the output (output characteristic B) of the sensing circuit (device main body 1) in accordance with the difference Δ, or outputs, together with the output of the sensing circuit (device main body 1), the calibration data X or the difference Δ from the design basis value Y that is necessary for correcting the output.

The output deviation or dispersion of the sensing circuit (device main body 1) caused due to an individual difference of the integrated circuit device generally shows itself as a shift of the output characteristic by a certain amount in the positive or negative direction from the intended output characteristic A, as indicated by the output characteristic B in FIG. 5. Rarely, however, the sensing circuit shows an output characteristic of which the gradient of output change relative to temperature differs from that of the intended output characteristic A, as indicated by the dot-and-dash line C in FIG. 5. In such cases, with the sensing circuit kept in a plurality of different temperature environments, for example, outputs $X_1, X_2, \ldots, X_n$ of the sensing circuit may be obtained so that the output characteristic C may be calibrated at multiple points corresponding to the outputs $X_1, X_2, \ldots, X_n$. In the case of performing multipoint calibration, it is necessary that information about the temperature environments corresponding to the respective outputs $X_1, X_2, \ldots, X_n$ should be retained as well. Also, multipoint calibration makes it possible to effectively correct (calibrate) the output of the sensing circuit (device main body 1) even in cases where the output does not show a linear characteristic like those shown in FIG. 5 and has a curved characteristic.

Figure 6:
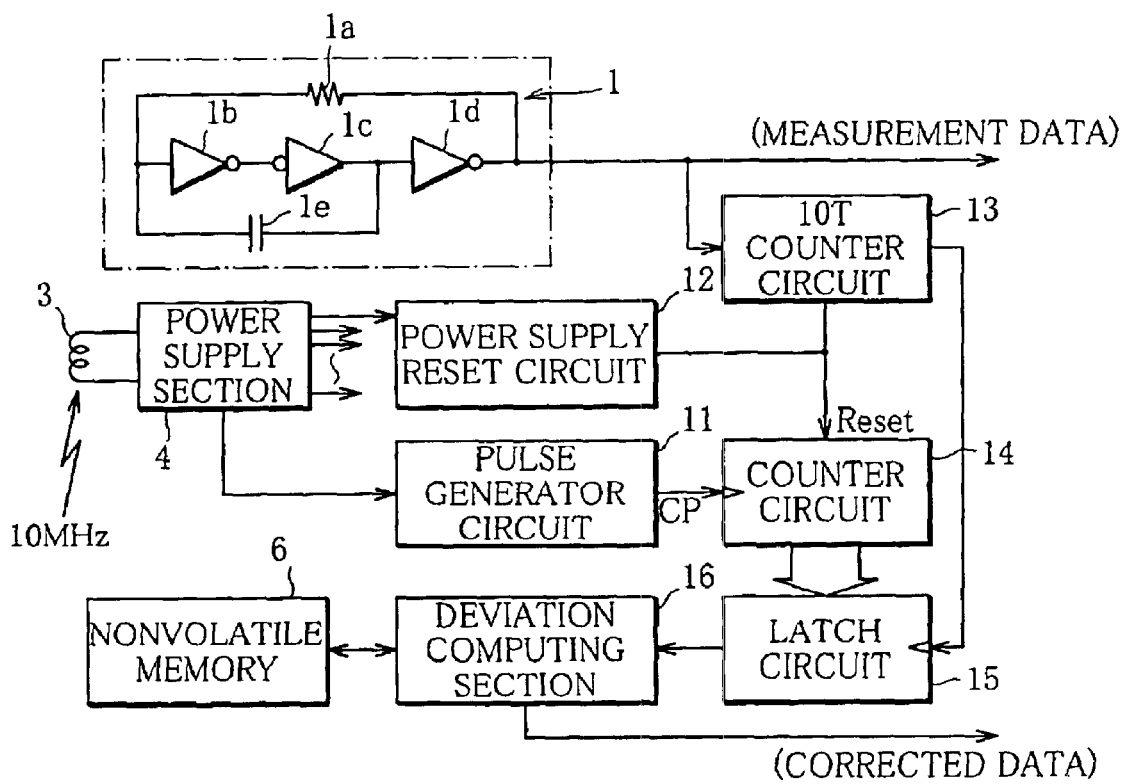
FIG. 6 is a diagram showing a ring oscillator as a sensing circuit, which is an example of the device main body, along with an example of a circuit for detecting a pulse signal output from the ring oscillator.

A concrete example of the integrated circuit device constructed as above will be now described with reference to FIG. 6. The illustrated integrated circuit device constitutes a clinical thermometer, and the device main body 1 forming a sensing circuit is embodied as a ring oscillator, which comprises a resistor 1*a* serving as a temperature-sensitive element, three serial inverter circuits 1*b*, 1*c* and 1*d* connected in ring form with the resistor 1*a* inserted, and a capacitor 1*e* for imparting a phase difference between the input and the output of the two inverter circuits 1*b* and 1*c*.

Where the resistor 1*a* serving as the temperature-sensitive element of the ring oscillator (device main body 1) is implemented by a CMOS well resistor of a semiconductor forming the integrated circuit device, the oscillation frequency of the ring oscillator is set so as to change by 0.34% with a temperature change of 1° C., for example, by utilizing the property of the CMOS well resistor that the resistance value thereof varies by 0.3% (3000 ppm) with a temperature change of 1° C. Also, the circuit constant of the ring oscillator is set such that the ring oscillator outputs a pulse signal having a period of 100 μsec, that is, an oscillation frequency of 10 kHz, for example, at an environmental temperature of 36.0° C.

Let it be assumed that integrated circuit devices (clinical thermometers) of this type are mass-produced and their oscillation frequency varies by a maximum of 2.0%, the oscillation frequency dispersion of 2% results in a temperature deviation of as large as $$2.0[\%] \div 0.3[\%/° C] \approx 7.0[° C.]$$

In general, it is necessary that clinical thermometers be able to measure temperature (body temperature) with a resolution of 0.01° C. to 0.1° C. in a temperature range of 34.0 to 42.0° C., and thus the above oscillation frequency dispersion is not permissible at all. In other words, where the resistor 1*a* as the temperature-sensitive element is implemented by the CMOS well resistor, the required measurement resolution is not attained because of large dispersion of the oscillation frequency. Conventionally, therefore, different types of component such as thermistor have been generally used as the temperature-sensitive element.

According to the present invention, the integrated circuit device is placed in a thermostatic chamber, for example, to be kept in a constant operating environment with the temperature set at 36.0° C., for example. While in this state, electromagnetic wave energy at 10 MHz, for example, is applied to the integrated circuit device to operate same, and the output (pulse signal) of the device main body 1 (ring oscillator) is detected by the operation control section 5 to obtain calibration data.

Specifically, a pulse generator circuit 11, which constitutes a functional part of the aforementioned information decoding section 7, generates a 10 MHz reference clock signal CP from the alternating current of the electromagnetic wave energy received through the coil 3. A power supply reset circuit 12 detects the startup (start of operation) of the power supply section 4 and generates a reset signal (initialization signal) that triggers acquisition of the calibration data on the device main body 1. First and second counter circuits 13 and 14, which are initialized by the reset signal, count the output (pulse signal) of the device main body 1 (ring oscillator) and the reference clock signal CP, respectively. On counting up to 10 pulses of the pulse signal output from the ring oscillator, for example, the first counter circuit 13 drives a latch circuit 15. Thereupon, the latch circuit 15 fetches the count (number of pulses) of the reference clock signal CP then held by the second counter circuit 14, to thereby detect the period of the pulse signal output from the ring oscillator. A deviation computing section 16, which is a functional part of the operation control section 5, writes the period of the pulse signal (count of the reference clock signal CP), obtained by the latch circuit 15, into the nonvolatile memory 6 as the calibration data.

More specifically, in the case where the frequency of the pulse signal output from the ring oscillator (device main body 1) in a temperature environment of 36° C. has a deviation of 2% (10.2 kHz) in the positive direction, the period of the pulse signal, which should originally have a width of 100 μsec, is approximately 98.0 μsec (1÷10.2K). The first counter circuit 13 counts the pulse signal over 10 periods, for example, and on counting up to 10 pulses, the counter circuit 13 operates the latch circuit 15.

On the other hand, the second counter circuit 14 counts the aforementioned 10 MHz reference clock signal CP, and when the first counter circuit 13 has counted up to 10 pulses of the pulse signal output from the ring oscillator (device main body 1), the count then held by the second counter circuit 14 is latched by the latch circuit 15. The period of the reference clock signal CP is 0.1 μsec, and accordingly, the count of the reference clock signal CP counted by the second counter circuit 14 and latched by the latch circuit 15 naturally represents a time interval corresponding to 10 pulses of the pulse signal output from the ring oscillator (device main body 1). For example, if the second counter circuit 14 counts 9800 pulses of the reference clock signal CP while the first counter circuit 13 counts up to 10 pulses of the output from the ring oscillator, then the count of the second counter circuit shows a time interval of 980 μsec, indicating that the period of the pulse signal output from the ring oscillator (device main body 1) is 98.0 μsec. The deviation computing section 16 writes the period (or count) of the pulse signal thus obtained by the latch circuit 15, into the nonvolatile memory 6 as the calibration data on the ring oscillator.

Let it be assumed that the integrated circuit device (clinical thermometer), which has acquired the calibration data as described above, is actually used to measure the temperature of a subject for detection, and in this case, if 9900 pulses of the reference clock signal CP were counted while the ring oscillator outputs 10 pulses of the pulse signal, the temperature is corrected in the manner described below.

The content of the nonvolatile memory 6 in the integrated circuit device shows that the ring oscillator has an output characteristic of 9800 pulses (count of the reference clock signal CP during the time interval corresponding to 10 pulses) at 36.0° C. In this case, the actual count shows a difference of 100 pulses, and since 100 pulses of the reference clock signal CP with a period of 0.1 μsec correspond to a time interval of 10.0 μsec, the difference can be represented as $$10.0[\mu sec] \div 980[\mu sec] = 1.02[\%]$$

The ring oscillator is set such that the oscillation frequency thereof changes by 0.3% with a temperature change of 1° C., as described above; therefore, the difference shows a temperature higher than the criterion temperature of 36.0° C. by $$1.02[\%] \div 0.3[\%/° C.] \approx 3.4[° C.]$$

Consequently, the actual measurement temperature is derived as $$36.0[° C.] + 3.4[° C.] = 39.4[° C.]$$

Thus, by storing the output of the ring oscillator at 36.0° C. in the nonvolatile memory 6 as the calibration data in terms of the pulse count, it is possible to easily and effectively correct a measurement temperature obtained as the number of pulses of the output from the ring oscillator in an actual measurement environment, by using the calibration data. It is therefore unnecessary to correct the output characteristic of the ring oscillator by the aforementioned trimming of the thin film resistor, etc. Also, even if dispersion of the output characteristic attributable to manufacturing error is as large as a maximum of 2.0%, a measurement temperature represented by the output can be corrected (calibrated) using the calibration data stored in the nonvolatile memory 6, whereby the output or the output characteristic can be corrected with ease.

Figure 7:
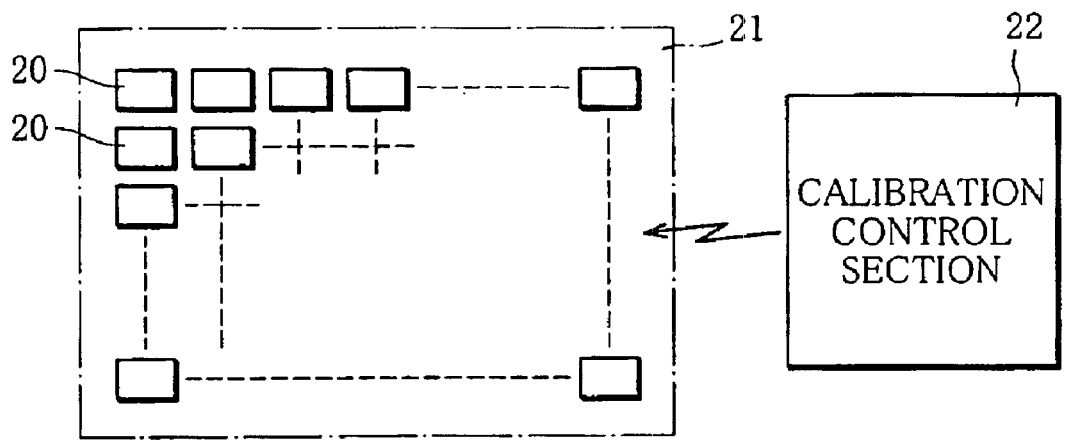
FIG. 7 is a conceptual diagram illustrating a collective calibration process for multiple integrated circuit devices.

As described above, when the integrated circuit device is operated using electromagnetic wave energy, the device itself generates internal electric power and acquires calibration data on the device main body 1. Accordingly, where a plurality of integrated circuit devices are to be calibrated, the integrated circuit devices 20 may be placed in a thermostatic chamber 21, as shown in FIG. 7, for example, to be kept in a predetermined temperature environment, and electromagnetic wave energy may be applied from an external calibration control section 22 collectively to the integrated circuit devices 20 to operate same.

As the electromagnetic wave energy is applied collectively to the multiple integrated circuit devices 20, the individual devices 20 acquire the calibration data, so that the calibration can be efficiently performed in a short time. Especially, since it is unnecessary to mechanically connect each of the integrated circuit devices 20 to a calibrating apparatus, power supply unit, etc. for calibration, the efficiency of calibration work is remarkably high.

In the case where the period of the pulse signal output from the ring oscillator (device main body 1) in the temperature environment of 36.0° C. is derived as 9800 pulses in terms of a pulse count of the reference clock signal CP during the time interval corresponding to 10 pulses of the pulse signal, as mentioned above, the output temperature value itself may be corrected based on the pulse count. Since the design value of the ring oscillator is set such that the oscillator generates a pulse signal with a period of 100 μsec at 36.0° C., the pulse count of the reference clock signal CP during the time interval corresponding to 10 pulses should originally be 10,000 pulses.

From a difference of 200 pulses, it is judged that the period of the pulse signal has a deviation of 2 μsec, and the deviation from the design basis value (100 μsec) is obtained as $$2[\mu sec] \div 100[\mu sec] = 2.0[\%]$$

Since the ring oscillator is set such that the frequency thereof varies by 0.3% with a temperature change of 1° C., the above 2.0% deviation can be expressed as a temperature deviation of $$2[\%] \div 0.3[\%/°C.] \approx 6.7[°C.]$$

Based on the temperature deviation, a temperature value is derived at which the time interval corresponding to 10 pulses of the pulse signal output from the ring oscillator becomes equivalent to 10,000 pulses of the reference clock signal CP, and the result shows a temperature higher than the design temperature value of 36.0° C., as indicated by $$36.0[°C.] + 6.7[°C.] = 42.7[°C.]$$

The ring oscillator may be calibrated based on the thus-derived temperature value.

Namely, where the pulse count is 9800 at 36.0° C., for example, a temperature at which the pulse count becomes 10,000 may be calculated back based on the design frequency change of 0.3% with a temperature change of 1° C., and the output may be corrected based on the derived temperature value. The temperature deviation of 6.7° C. may be stored as a calibration value, and a temperature value obtained by adding the calibration value to temperature data obtained in an actual measurement environment may be output.

In the foregoing embodiment, 10 pulses of the pulse signal output from the ring oscillator are counted to obtain the time interval required. In cases where higher measurement accuracy is required, the time interval corresponding to 100 pulses may be measured to obtain the calibration data. Also, instead of storing information about the time interval measured in this manner, a deviation from the design basis value may be stored as the calibration data. In this case, the memory capacity required of the nonvolatile memory 6 can be reduced.

Further, in the embodiment described above, the calibration is performed at the preset environmental temperature of 36.0° C., but the environmental temperature may be suitably determined according to the application of the integrated circuit device. Clinical thermometers for dogs and cats, for example, are expected to measure temperature higher than that to be measured by clinical thermometers for the human body, and therefore, calibration may be performed at a criterion temperature of 42.0° C. Also, the calibration data may be obtained for a plurality of temperature points, for example, at 30.0° C., 35.0° C., 40.0° C. and 45.0° C., and using these items of calibration data, the output characteristic may be corrected at the multiple points. In this case, a deviation Δ of the pulse count (output X) of the reference clock signal CP measured in the aforementioned manner from the design basis value (design value Y), obtained at each temperature point, may be written as calibration data into the nonvolatile memory 6 together with the temperature information. By thus writing the deviations Δ in the nonvolatile memory 6 as the calibration data, it is possible to reduce the memory capacity required of the nonvolatile memory 6.

In the integrated circuit device having the aforementioned calibrating function, the measurement data may be corrected and displayed by the output section 2 of the integrated circuit device. Alternatively, the calibration data stored in the nonvolatile memory 6 and the measurement data obtained from the device main body 1 may be transmitted via a transmitting section 8 shown in FIG. 1 to a predetermined host computer (not shown) so that the correction of the measurement data based on the calibration data may be performed on the host computer side. Instead, the measurement data may be corrected in the integrated circuit device and the corrected data may be transmitted to the host computer via the transmitting section 8. In this case, the coil 3 can of course be used as a transmitting antenna. Further, when the reset signal is generated by the power supply reset circuit 12, data indicative of the generation of the reset signal may be transmitted via the transmitting section 8 to a host computer (external device), not shown, to inform the host computer that the measurement and the calibration have been started in the integrated circuit device.

Where the device main body 1 is constituted by a ring oscillator as in the above case, it is probable that the period of the pulse signal output from the ring oscillator fluctuates under the influence of the power supply voltage. To avoid the inconvenience, preferably, the operation control section 5, for example, notifies the host computer that the measurement and the calibration have been started, and the host computer, which is thus supplied with the notification, controls the electromagnetic wave energy applied to the integrated circuit device such that the magnitude thereof is kept constant. Alternatively, the magnitude of the electromagnetic wave energy may be gradually increased at first, and on receiving a response from the integrated circuit device side that the power supply voltage has stabilized, the host computer may initiate control such that the magnitude of the electromagnetic wave energy is kept at the then-applied level.

Either of the above control procedures permits the magnitude of the electric power that the integrated circuit device receives through the coil 3 to be maintained constant, whereby the voltage Vcc of the internal electric power generated by the power supply section 4 can be stabilized with ease. Consequently, fluctuation of the output of the device main body 1 attributable to the power supply voltage Vcc can be suppressed during the measurement or calibration, thus enabling higher-accuracy measurement and calibration. In other words, during the calibration and the measurement, the integrated circuit device operates while being applied with the same power supply voltage Vcc, and also since fluctuation of the power supply voltage Vcc is suppressed during the operation, the device main body 1 can always provide a stable output. Further, the regulator 4c provided in the power supply section 4 is not required to have very high stabilizing capability, and this permits the construction of the regulator to be simplified.

Actual measurement data may be successively stored in a memory, not shown, and when a data output request is received from the host computer, the measurement data stored in the memory may be read out, along with the calibration data and calibration environment data stored in the nonvolatile memory 6, to be collectively transmitted to the host computer. This enables effective collection of temperature information etc. obtained by the integrated circuit device even in environments where there are restrictions on the information transmission via the coil 3 (antenna) because of its smallness in size.

Especially in the case where the integrated circuit device is constructed by integrating various functional elements on the surface of a spherical semiconductor with a diameter of about 1 mm, a well resistor itself may be used to perform the function of a temperature-sensitive element so that the integrated circuit device may constitute a clinical thermometer or the like, thus providing a remarkable advantage of high practicality. Namely, it is unnecessary to incorporate an additional temperature-sensitive element such as a thermistor into the integrated circuit device. In addition, even if the integrated circuit device (clinical thermometer) is mass-produced while allowing a certain degree of dispersion of the characteristic thereof attributable to manufacturing error, the produced devices have the function of correcting such dispersion, so that the devices can be manufactured at low cost and yet can be used for high-accuracy measurement.

In the foregoing description of the embodiment, a ring oscillator whose output varies in response to temperature is taken as an example. Where the device main body 1 is fabricated as a sensing circuit whose output varies in response to pressure, an operating environment may be created wherein a constant pressure is applied to the device main body. Similarly, the invention can be applied to various other environments in which the device main body is to respond to other environmental factors (humidity, oxygen concentration, etc.).

Figure 8:
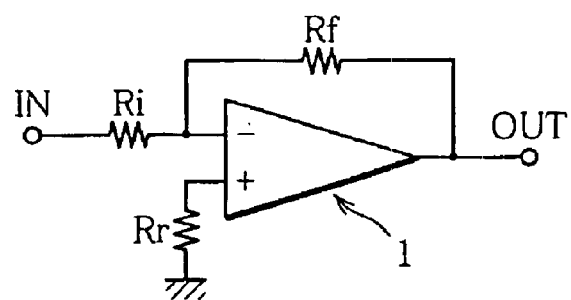
FIG. 8 is a diagram showing the arrangement of an amplifier which is another example of the device main body.

The device main body 1 may be constructed as an amplifier as shown in FIG. 8, for example, which provides a predetermined output signal corresponding to an input signal applied thereto, and also in this case, the output signal can be corrected based on acquired calibration data. Where such an amplifier is constructed, a pseudo input generating section 9 may be provided as shown in FIG. 1, for example, to apply a pseudo input signal to the device main body 1, and the output of the device main body (amplifier) 1 in response to the pseudo input signal may be detected to obtain calibration data.

In the case where the electric power for driving the device main body 1 affects the operating characteristic thereof, data on the power supply voltage Vcc applied at the time of calibration may also be written into the nonvolatile memory 6 as one item of calibration data. It is also useful to perform the aforementioned acquisition of calibration data only while the received electromagnetic wave energy ensures a predetermined power supply voltage Vcc.

After the calibration data is stored in the nonvolatile memory 6, for example, the coil 3 is preferably short-circuited at both ends so that the acquisition of calibration data may not take place accidentally or uselessly. In this case, even if external noise is received by the coil 3, its energy is consumed within the coil 3, whereby generation of pulsing noise that causes malfunction can be prevented.

Also, in the above embodiment, the calibration data is acquired by counting the pulses of the reference clock signal CP, but the output voltage value of the device main body 1 or other information may of course be acquired as the calibration data. It is to be noted that the present invention can be modified in various other ways without departing from the scope and spirit of the invention.

INDUSTRIAL APPLICABILITY

In the integrated circuit device according to the present invention, energy supplied in the form of electromagnetic waves is received through the coil to generate internal electric power, and the output of the device main body is detected in a predetermined operating environment to acquire calibration data, which is then stored in the non-volatile memory. Accordingly, deviation or dispersion of the output of the device main body from the intended characteristic can be effectively corrected (calibrated) with ease.

Also, the calibration can be carried out in a non-contact manner, without the need to connect individual integrated circuit devices to external apparatus. Further, even in cases where a large number of integrated circuit devices are to be calibrated, the devices can be collectively calibrated, thus providing a remarkable advantage of high practicality.

What is claimed is:

1. A calibration system for an integrated circuit device comprising:
   an integrated circuit device; and
   a calibration control section for wirelessly supplying electromagnetic wave energy containing information for starting a calibration operation,
   said integrated circuit device including:
   a device main body having a predetermined circuit function;
   a power supply section including a coil, for receiving through the coil electromagnetic wave energy applied from outside to generate internal electric power;
   an information decoding section for taking out information, contained in the electromagnetic wave energy, for starting a calibration operation,
   a calibration data acquisition circuit operable on receiving the information for starting a calibration operation from said information decoding section, for detecting the output of said device main body operated in a predetermined operating environment to obtain calibration data on said device main body; and
   a nonvolatile memory for storing the calibration data obtained by said calibration data acquisition circuit.

2. A calibration system for an integrated circuit device according to claim 1, wherein said nonvolatile memory stores, in addition to the calibration data, information about the predetermined operating environment in which the output of said device main body was detected.

3. A calibration system for an integrated circuit device according to claim 2, further comprising calibration processing means for correcting the output of said device main body in accordance with the calibration data stored in said nonvolatile memory.

4. A calibration system for an integrated circuit device according to claim 2, further comprising data output means for outputting, together with the output of said device main body, the calibration data stored in said nonvolatile memory.

5. A calibration system for an integrated circuit device according to claim 1, wherein said device main body comprises a sensing circuit provided with a temperature-sensitive element or a pressure-sensitive element.

6. A calibration system for an integrated circuit device according to claim 1, wherein said device main body comprises a signal transfer circuit for providing an output signal corresponding to an input signal applied thereto, and
   said calibration data acquisition circuit generates a pseudo input signal for said signal transfer circuit, and uses the pseudo input signal to detect the output signal of said signal transfer circuit.

7. A calibration method for an integrated circuit device, comprising:
   preparing a plurality of calibration systems for integrated circuit devices according to claim 1;
   placing said plurality of calibration systems in a predetermined environment;
   applying electromagnetic wave energy collectively to said calibration systems placed in the predetermined environment to operate same, thereby acquiring calibration data; and storing the calibration data in corresponding nonvolatile memories associated with the respective calibration systems.

8. The calibration method according to claim 7, wherein said calibration systems each have an integrated circuit device including a device main body including a temperature-sensitive element, and with said integrated circuit device placed in a thermostatic chamber to be kept in the predetermined environment, a calibration process for said integrated circuit device is performed.

9. A calibration method for an integrated circuit device, comprising:

preparing a plurality of calibration systems for integrated circuit devices according to claim 2;

placing said plurality of calibration systems in a predetermined environment;

applying electromagnetic wave energy collectively to said calibration systems placed in the predetermined environment to operate same, thereby acquiring calibration data; and storing the calibration data in corresponding nonvolatile memories associated with the respective calibration systems.

10. A calibration method for an integrated circuit device, comprising:

preparing a plurality of calibration systems for integrated circuit devices according to claim 3;

placing said plurality of calibration systems in a predetermined environment;

applying electromagnetic wave energy collectively to said calibration systems placed in the predetermined environment to operate same, thereby acquiring calibration data; and storing the calibration data in corresponding nonvolatile memories associated with the respective calibration systems.

11. A calibration method for an integrated circuit device, comprising:

preparing a plurality of calibration systems for integrated circuit devices according to claim 4;

placing said plurality of calibration systems in a predetermined environment;

applying electromagnetic wave energy collectively to said calibration systems placed in the predetermined environment to operate same, thereby acquiring calibration data; and storing the calibration data in corresponding nonvolatile memories associated with the respective calibration systems.

12. A calibration method for an integrated circuit device, comprising:

preparing a plurality of calibration systems for integrated circuit devices according to claim 5;

placing said plurality of calibration systems in a predetermined environment;

applying electromagnetic wave energy collectively to said calibration systems placed in the predetermined environment to operate same, thereby acquiring calibration data; and storing the calibration data in corresponding nonvolatile memories associated with the respective calibration systems.

13. A calibration method for an integrated circuit device, comprising:

preparing a plurality of calibration systems for according to claim 6;

placing said plurality of calibration systems in a predetermined environment;

applying electromagnetic wave energy collectively to said calibration systems placed in the predetermined environment to operate same, thereby acquiring calibration data; and storing the calibration data in corresponding nonvolatile memories associated with the respective calibration systems.

14. The calibration method according to claim 9, wherein said calibration systems each have an integrated circuit device including a device main body including a temperature-sensitive element, and with said integrated circuit devices placed in a thermostatic chamber to be kept in the predetermined environment, a calibration process for said integrated circuit device is performed.

15. The calibration method according to claim 10, wherein said calibration systems each have an intergrated circuit device including a device main body including a temperature-sensitive element, and with said integrated circuit devices placed in a thermostatic chamber to be kept in the predetermined environment, a calibration process for said integrated circuit device is performed.

16. The calibration method according to claim 11, wherein said calibration systems each have an integrated circuit including a device main body including a temperature-sensitive element, and with said integrated circuit devices placed in a thermostatic chamber to be kept in the predetermined environment, a calibration process for said integrated circuit device is performed.

17. The calibration method according to claim 12, wherein said calibration systems each have an integrated circuit including a device main body including a temperature-sensitive element, and with said integrated circuit devices placed in a thermostatic chamber to be kept in the predetermined environment, a calibration process for said integrated circuit device is performed.

18. The calibration method according to claim 13, wherein said calibration systems each have an integrated circuit including a device main body including a temperature-sensitive element, and with said integrated circuit devices placed in a thermostatic chamber to be kept in the predetermined environment, a calibration process for said integrated circuit device is performed.

* * * * *